US010028179B2

(12) United States Patent
Cherian et al.

(10) Patent No.: US 10,028,179 B2
(45) Date of Patent: Jul. 17, 2018

(54) REDUCING SIGNALING DURING AP TO AP HANDOFF IN DENSE NETWORKS

(71) Applicant: QUALCOMM Incorporated, San Diego, CA (US)

(72) Inventors: George Cherian, San Diego, CA (US); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 14/160,499

(22) Filed: Jan. 21, 2014

(65) Prior Publication Data

US 2014/0355564 A1    Dec. 4, 2014

Related U.S. Application Data

(60) Provisional application No. 61/829,944, filed on May 31, 2013.

(51) Int. Cl.
*H04W 36/38* (2009.01)
*H04W 36/00* (2009.01)
*H04W 12/04* (2009.01)
*H04W 12/06* (2009.01)
*H04L 29/06* (2006.01)
*H04W 12/10* (2009.01)
*H04W 84/12* (2009.01)

(52) U.S. Cl.
CPC ...... *H04W 36/0038* (2013.01); *H04W 12/04* (2013.01); *H04W 12/06* (2013.01); *H04L 63/123* (2013.01); *H04W 12/10* (2013.01); *H04W 84/12* (2013.01)

(58) Field of Classification Search
CPC .. H04L 63/0428; H04W 12/06; H04W 12/08; H04W 12/04; H04W 84/18
See application file for complete search history.

(56) References Cited

U.S. PATENT DOCUMENTS

| | | | |
|---|---|---|---|
| 9,503,970 B2 * | 11/2016 | Horn | H04L 12/66 |
| 2003/0115460 A1 * | 6/2003 | Arai | H04W 12/04 |
| | | | 713/168 |
| 2004/0068668 A1 * | 4/2004 | Lor | H04L 63/107 |
| | | | 726/15 |
| 2006/0075234 A1 * | 4/2006 | You | H04L 9/321 |
| | | | 713/169 |
| 2006/0191000 A1 * | 8/2006 | O'Hara, Jr. | H04L 63/062 |
| | | | 726/12 |

(Continued)

*Primary Examiner* — Alex Skripnikov
(74) *Attorney, Agent, or Firm* — Arent Fox, LLP

(57) ABSTRACT

A method, an apparatus, and a computer program product for wireless communication are provided. The apparatus may be a STA. The STA communicating with a first AP based on a key. The STA receives an identifier broadcasted from a second AP. The STA determines whether the key can be used with the second AP based on the received identifier. The STA selects the second AP upon determining the key can be used with the second AP. The STA requests a transfer of association context information from the first AP to the second AP. The key may be a PTK. The PTK may be a function of the identifier. The identifier may be a zone identifier identifying a set of APs that belong to a security domain in which the association context information of the STA can be transferred from one AP to another AP.

20 Claims, 12 Drawing Sheets

(56) References Cited

U.S. PATENT DOCUMENTS

| | | | |
|---|---|---|---|
| 2007/0064647 A1* | 3/2007 | Prasad | H04L 63/0869 370/331 |
| 2007/0071010 A1* | 3/2007 | Iyer | H04L 12/4641 370/395.53 |
| 2007/0097934 A1* | 5/2007 | Walker | H04L 63/0428 370/338 |
| 2009/0180396 A1* | 7/2009 | Kish | H04L 45/125 370/254 |
| 2010/0211790 A1* | 8/2010 | Zhang | H04L 9/321 713/171 |
| 2010/0332822 A1* | 12/2010 | Liu | H04W 12/04 713/151 |
| 2012/0264431 A1* | 10/2012 | Lee | H04W 36/0061 455/436 |
| 2013/0263223 A1* | 10/2013 | Cherian | H04L 9/0869 726/4 |
| 2013/0286862 A1* | 10/2013 | Sartori | H04W 76/023 370/252 |
| 2013/0297938 A1* | 11/2013 | Goto | H04L 9/0844 713/171 |
| 2015/0040195 A1* | 2/2015 | Park | H04W 12/06 726/4 |
| 2015/0281953 A1* | 10/2015 | Liu | H04W 76/023 380/283 |
| 2015/0312245 A1* | 10/2015 | Leinonen | G06F 21/73 713/156 |

\* cited by examiner

REDUCING SIGNALING DURING AP TO AP HANDOFF IN DENSE NETWORKS

CROSS-REFERENCE TO RELATED APPLICATION(S)

This application claims the benefit of U.S. Provisional Application Ser. No. 61/829,944, entitled "REDUCING SIGNALING DURING AP TO AP HANDOFF IN DENSE NETWORKS" and filed on May 31, 2013, which is expressly incorporated by reference herein in its entirety.

BACKGROUND

Field

The present disclosure relates generally to communication systems, and more particularly, to reducing signaling during access point (AP) to AP handoff in dense networks.

Background

In dense wireless local area networks (WLANs), stations (STAs) may be frequently handed off among different APs. Frequent handoffs may result in a greater proportion of signaling overhead to facilitate the handoffs. A greater proportion of signaling overhead to facilitate handoffs may result in a greater proportion of dropped or delayed packets during handoffs. Issues related to dropped or delayed packets may be magnified when handoffs are more frequent, such as in networks that employ fractal frequency reuse or networks that have densely located APs transmitting at a lower power. Accordingly, there is a need to reduce signaling overhead during handoffs in order to improve handoff efficiency and to reduce dropped or delayed packets due to the signaling overhead during handoffs.

SUMMARY

In an aspect of the disclosure, a method, a computer program product, and an apparatus are provided for WLAN communication. The apparatus may be a STA. The STA communicates with a first AP based on a key. The STA receives an identifier broadcasted from a second AP. The STA determines whether the key can be used with the second AP based on the received identifier. The STA selects the second AP upon determining the key can be used with the second AP. The STA requests a transfer of association context information from the first AP to the second AP.

In an aspect of the disclosure, a method, a computer program product, and an apparatus are provided for WLAN communication. The apparatus may be a second AP. The second AP broadcasts an identifier associated with a set of APs. The set of APs includes the second AP. The second AP receives a transfer request from a STA in response to the broadcasted identifier. The second AP obtains information from a first AP based on the received transfer request. The information includes a key. The second AP receives the STA in a handoff from the first AP. The second AP communicates with the STA based on the obtained information and the key.

The key obtained from the first AP and utilized in communication with the STA may be a pairwise transient key (PTK). The PTK may be a function of the broadcasted identifier. The broadcasted identifier may be a zone identifier identifying the set of APs that belong to a security domain in which context information of the STA can be transferred from one AP to another AP. The transfer request may request a transfer of the information from the first AP to the second AP. The transfer request may be protected with a message integrity code (MIC), and the second AP may verify the MIC of the transfer request based on the key upon obtaining the information. The transfer request may include an identifier of the first AP and an identifier of the STA. The identifier of the first AP may be a media access control (MAC) address of the first AP. The identifier of the STA may be an association identifier of the STA. The identifier of the STA may be a MAC address of the STA or an identifier derived or mapped from the MAC address of the STA. The communication with the STA based on the obtained information and the key may occur without previously performing a four-way handshake with the STA to generate a key after the handoff.

In an aspect of the disclosure, a method, a computer program product, and an apparatus are provided for WLAN communication. The apparatus may be a STA. The STA communicates with a first AP based on information. The information includes a key. The STA moves into coverage of a second AP while communicating with the first AP. The STA communicates a packet with the second AP without having previously performed a four-way handshake with the second AP to generate a key. The packet is protected by the key utilized for the communication with the first AP.

The STA may receive an identifier broadcasted from the second AP, and determine that the second AP is associated with the first AP based on the received broadcasted identifier. To communicate the packet, the STA may send an uplink packet protected based on the key to the second AP upon determining that the second AP is associated with the first AP. The STA may protect the uplink packet based on the key prior to sending the uplink packet. The STA may move in a handoff from the first AP to the second AP upon sending the uplink packet to the second AP, and communicate with the second AP based on the key without previously performing a four-way handshake with the second AP to generate a key after the handoff. The STA may receive a second identifier broadcasted from the first AP. The second AP may be determined to be associated with the first AP when the received broadcasted identifier is identical to the received second broadcasted identifier. To communicate the packet, the STA may receive a downlink packet protected based on the key from the second AP. The key may be a PTK. The PTK may be a function of an identifier associated with both the first AP and the second AP. The identifier may be a zone identifier identifying a set of APs that belong to a security domain in which context information of the STA can be transferred from one AP to another AP, and the set of APs may include the first AP and the second AP. The STA may generate the key with the first AP during a four-way handshake with the first AP.

In an aspect of the disclosure, a method, a computer program product, and an apparatus are provided for WLAN communication. The apparatus may be a second AP. The second AP receives backhaul information about a STA not responding to a first AP. The backhaul information includes an identifier of the STA. The second AP sends a page to the STA. The second AP receives a page response from the STA. The second AP obtains information associated with the STA from the first AP. The information includes a key. The second AP communicates with the STA based on the information and the key.

The backhaul information may be received from the first AP. The backhaul information may be received from a central controller. The key obtained from the first AP and utilized in communication with the STA may be a PTK. The second AP may broadcast an identifier associated with a set of APs, the set of APs may include the second AP, and the key may be a function of the broadcasted identifier. The broadcasted identifier may be a zone identifier identifying the set of APs that belong to a security domain in which context information of the STA can be transferred from one AP to another AP. The identifier of the STA may be an association identifier of the STA. The identifier of the STA may be a MAC address of the STA or an identifier derived or mapped from the MAC address of the STA.

DETAILED DESCRIPTION

Figure 1:
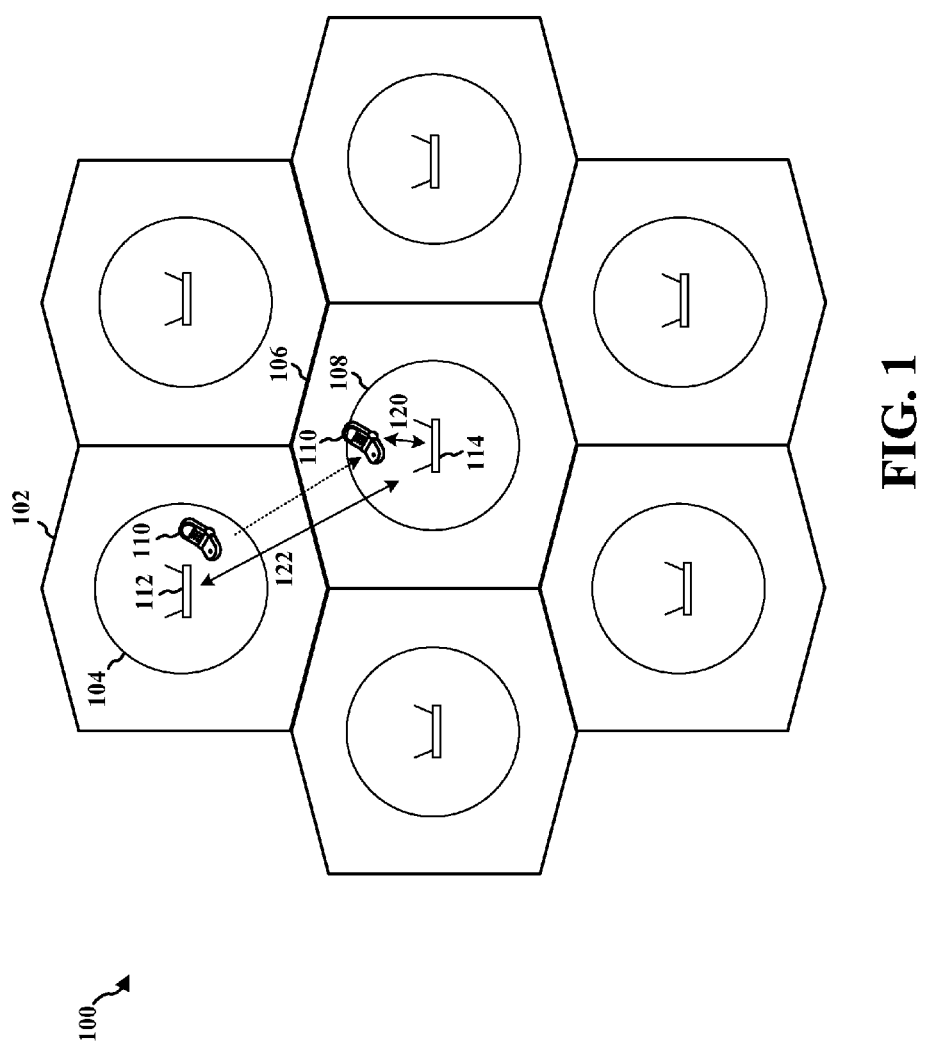
FIG. 1 is a diagram illustrating a fractal frequency reuse WLAN network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

As those skilled in the art will readily appreciate from the detailed description to follow, the various concepts presented herein are well suited for IEEE 802.11 (Wi-Fi) applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Long Term Evolution (LTE); Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.16 (WiMAX), IEEE 802.20, and Flash-OFDM employing OFDMA.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram 100 illustrating a fractal frequency reuse (FFR) WLAN network. In an FFR network or a network that has densely located APs transmitting at a lower power, STAs may have frequent handoffs between the APs in the network. For example, referring to FIG. 1, as the STA 110 moves through the network, the STA 110 moves from a first frequency of a lower power cell 104 of the AP 112 to a second frequency of a higher power cell 102 of the AP 112, from the second frequency of the higher power cell 102 of the AP 112 to a third frequency of a higher power cell 106 of the AP 114, and from the third frequency of the higher power cell 106 of the AP 114 to a fourth frequency of a lower power cell 108 of the AP 114. During each of the basic service set (BSS) transitions, the STA and the AP may need to perform signaling to facilitate the BSS transition. The STA may experience some packet drops and/or delays due to the signaling in each of the BSS transitions. In order to reduce a signaling overhead during the BSS transitions, the AP 114 may exchange information 120, 122 with the STA 110 and/or with the AP 112. The AP 114 may additionally utilize particular identifiers and/or keys to reduce a signaling overhead during BSS transitions.

While a STA is depicted in FIG. 1, the various concepts presented herein are applicable to any device capable of WLAN communication, and in particular communication in compliance with IEEE 802.11. Examples of STAs include a user equipment (UE), a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The STA may also be referred to by those skilled in the art as a user equipment, mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
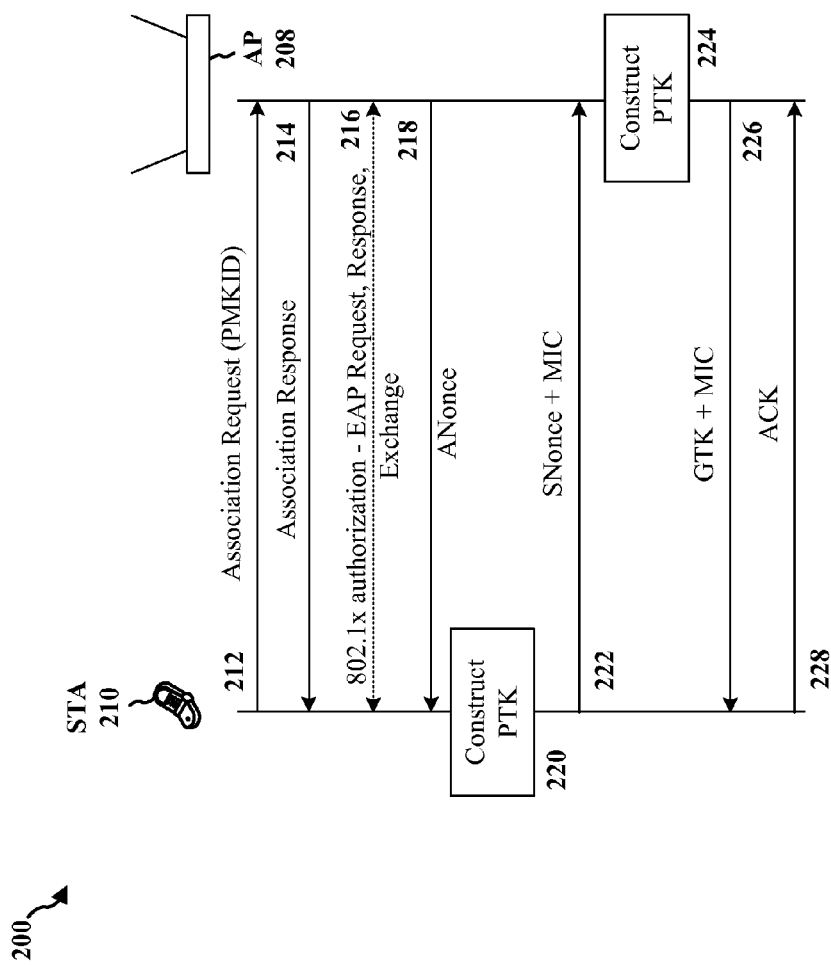
FIG. 2 is a diagram illustrating 802.1x authentication and a four-way handshake.

FIG. 2 is a diagram 200 illustrating 802.1x authentication and a four-way handshake. When a STA 210 transitions to the coverage of the AP 208, the STA 210 may need to perform 802.1x authentication (extensible authentication protocol (EAP) based authentication). If APs are managed by an operator and if opportunistic key caching (OKC) is deployed, the STA 210 may not need to perform 802.1x authentication in step 216, but must still perform a four-way handshake with the AP 208 in steps 218, 222, 226, 228. As shown in FIG. 2, the STA 210 sends a pairwise master key (PMK) identifier (ID) (PMKID) to the AP 208 in an association request 212 of an association request frame. If the PMKID matches one cached in association with a MAC address of the STA 210, the AP 208 acknowledges a match in the association response 214 of an association response frame, and the 802.1x authentication involving the EAP request, response, and exchange steps 216 is skipped. However, the STA 210 still performs a four-way handshake with the AP 208. In the four-way handshake with the AP 208, the STA 210 receives an ANonce (AP number used once) 218 from the AP 208 and constructs a PTK 220 based on the ANonce. The PTK is derived as a result of an extensible authentication protocol (EAPoL) pseudo random function (PRF) (EAPoL-PRF) of a PMK, the ANonce, an SNonce (STA number used once), a MAC address of AP 208, and a MAC address of the STA 210. Specifically, the STA 210 generates the PTK as follows: PTK=EAPoL-PRF (PMK, ANonce|SNonce|AP MAC Address|STA MAC Address). The STA 210 then sends to the AP 208 the SNonce 222 protected by a MIC derived based on the PTK. The AP 208 then constructs the PTK 224 and responds with a group temporal key (GTK) 226 protected by a MIC derived based on the PTK. The STA 210 sends an acknowledgment (ACK) 228 to the AP 208. The ANonce, SNonce, GTK, and ACK are sent in EAPoL key (EAPoL-Key) frames. In exemplary methods, the steps including the association request, the association response, the 802.1x authentication including the EAP request, response, and exchange, and the four-way handshake (three roundtrips not including the 802.1x authentication) may be skipped, thus reducing a signaling overhead during BSS transitions/handoffs of STAs between APs.

Figure 3:
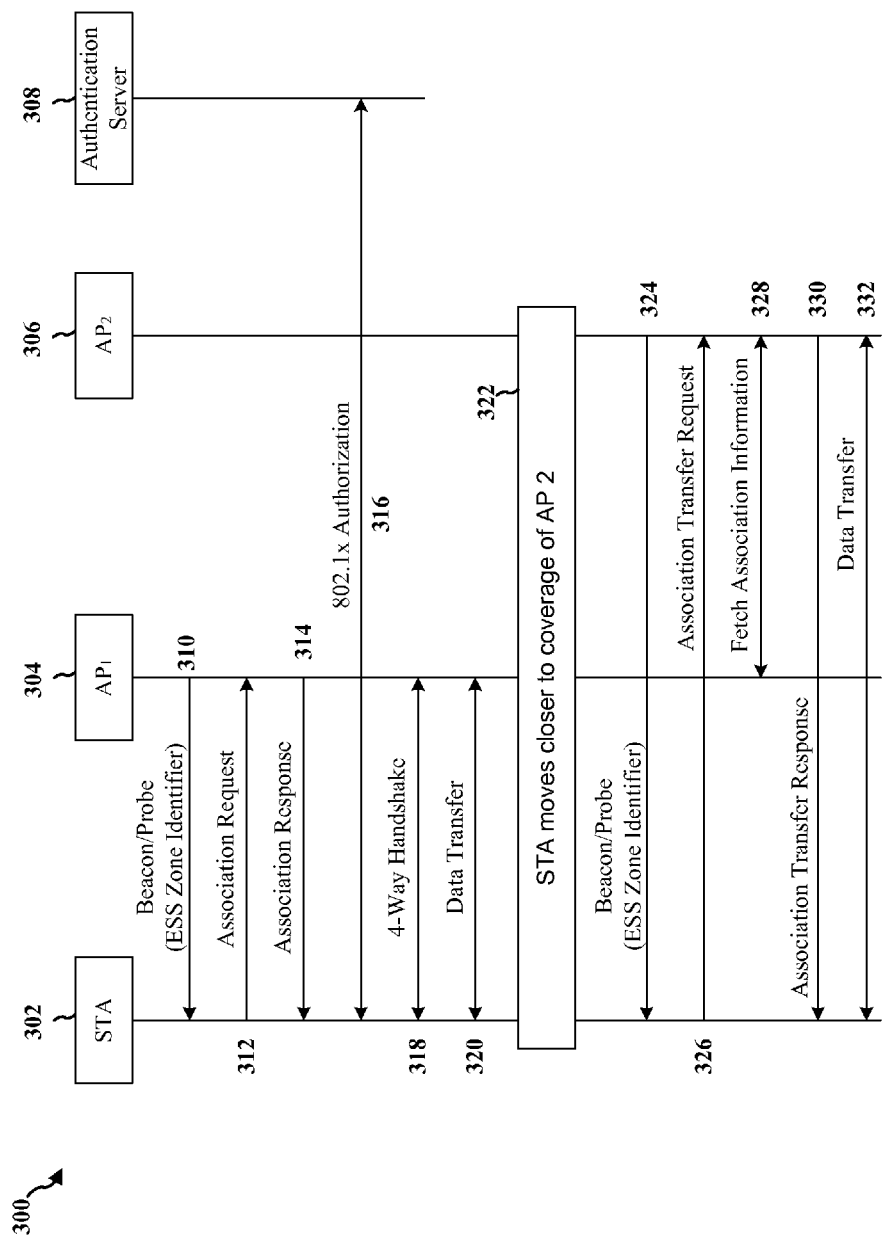
FIG. 3 is a diagram illustrating a first exemplary call flow.

FIG. 3 is a diagram 300 illustrating a first exemplary call flow. As shown in FIG. 3, in step 310, a STA 302 receives a beacon/probe with an identifier from a first AP ($AP_1$) 304. The identifier may be a zone identifier identifying a set of APs that belong to a security domain in which context information of the STA 302 can be transferred from one AP to another AP. In particular, the zone identifier may be an extended service set (ESS) zone identifier. The set of APs may be defined as an ESS zone. APs in the same ESS zone are capable of sharing association information associated with communication with particular STAs. Association information may include radio parameters (e.g., quality of service (QoS) requirements, preferences, number of flows, etc.) and/or keys for communicating with particular STAs. The set of APs may be preconfigured to broadcast the same identifier. As such, the set of APs includes the $AP_1$ 304 and other APs that broadcast the same identifier. For example, if the set of APs (i.e., a particular ESS zone) is preconfigured to include both the $AP_1$ 304 and a second AP ($AP_2$) 306, then the $AP_1$ 304 and the $AP_2$ 306 will broadcast the same identifier. The common broadcasted identifier may be referred to as a zone identifier or an ESS zone identifier.

In step 312, the STA 302 sends an association request to the $AP_1$ 304 in an association request frame. In step 314, the $AP_1$ 304 sends an association response to the STA 302 in an association response frame. The association response may include an association identifier of the STA 302. The association identifier is unique to the STA 302 within an ESS zone. The association identifier of the STA 302 may be shorter than the MAC address of the STA 302 and may have a one-to-one mapping between the MAC address of the STA 302. In step 316, the STA 302 performs an 802.1x authorization with the authentication server 308, which may include an EAP request, response, and exchange. In step 318, the STA 302 and the $AP_1$ 304 perform a four-way handshake and exchange EAPoL-Key frames in order to generate the PTK and exchange the GTK. Both the STA 302 and the $AP_1$ 304 generate the PTK based on the ESS zone identifier. In particular, the PTK is derived as a result of an EAPoL-PRF of a PMK, the ANonce, the SNonce, the ESS zone identifier, and the MAC address of the STA 302. Specifically, the PTK is generated as follows: PTK=EAPoL-PRF (PMK, ANonce|SNonce|ESS Zone Identifier|STA MAC Address).

In step 320, based on the keys generated/obtained during the four-way handshake, the STA 302 and the $AP_1$ 304 communicate. In step 322, the STA 302 moves into coverage of the $AP_2$ 306. The $AP_2$ 306 is in the same ESS zone as the $AP_1$ 304. Accordingly, the $AP_2$ 306 broadcasts the same ESS zone identifier in a beacon/probe as the $AP_1$ 304. If the $AP_2$ 306 is utilizing the same channel as the $AP_1$ 304 and the $AP_2$ 306 initiates the transition of the STA 302 to the $AP_2$ 306, the $AP_2$ 306 can monitor data sent by the STA 302 to the $AP_1$ 304 and coordinate with the $AP_1$ 304 and possibly other APs to determine the AP that can best serve the STA 302. If the $AP_2$ 306 determines that the $AP_2$ 306 is the best AP to serve the STA 302, the $AP_2$ 306 sends a BSS transition request frame to the STA 302 to redirect the STA 302 to the $AP_2$ 306. If the STA 302 initiates the transition to a new AP, the STA 302 receives the ESS zone identifier from the $AP_2$ 306 and determines whether the ESS zone identifier received from the $AP_2$ 306 is identical to the ESS zone identifier received from the $AP_1$ 304. If the ESS zone identifier is identical, the STA 302 determines that the $AP_2$ 306 is in the same ESS zone as the AP₁ 304. In step 326, the STA 302 determines that the AP₂ 306 and the AP₁ 304 are in the same ESS zone, and generates an association transfer request. The association transfer request requests the AP₂ 306 to request from the AP₁ 304 a transfer of association information necessary for communication with the STA 302. The association transfer request includes a MAC address of the AP₁ 304 and an identifier of the STA 302. The identifier of the STA 302 is a unique identifier of the STA 302 and may be an association identifier (e.g., an association identifier received in step 314) or a MAC address of the STA 302. The STA 302 protects the association transfer request using a MIC based on the PTK, and sends the association transfer request to the AP₂ 306 in an association transfer request frame (e.g., a protected management frame). The AP₂ 306 receives the association transfer request from the STA 302. In step 328, the AP₂ 306 contacts the AP₁ 304 at the AP MAC address received in the association transfer request, and provides the AP₁ 304 the identifier (e.g., an association identifier or a STA MAC address) of the STA 302. The AP₂ 306 receives association information in relation to the STA 302 from the AP₁ 304. The association information includes the PTK generated in the four-way handshake of step 318, and may further include radio parameters and/or other information necessary for communication with the STA 302. The AP₂ 306 then attempts to verify the MIC of the received association request based on the obtained PTK. If the AP₂ 306 is able to verify the MIC of the received association request, in step 330, the AP₂ 306 sends an association transfer response to the STA 302 in an association transfer response frame indicating that the AP₂ 306 was able to successfully fetch association information from the AP₁ 304. If the AP₂ 306 is unable to verify the MIC of the received association request, in step 330, the AP₂ 306 sends an association transfer response to the STA 302 in an association transfer response frame indicating that the AP₂ 306 was unable to successfully fetch association information from the AP₁ 304. Assuming the AP₂ 306 was able to verify the MIC of the received association request, in step 332, the STA 302 and the AP₂ 306 may then communicate based on the association information obtained by the AP₂ 306. Accordingly, in step 332, the STA 302 and the AP₂ 306 may communicate based on the PTK, which the AP₂ 306 obtained in the association information, and on the GTK, which the AP₂ 306 can generate based on the obtained PTK.

The steps described in relation to FIG. 3 reduce BSS transition signaling overhead from at least three roundtrips to one roundtrip (in steps 326, 330) between the STA 302 and the AP₂ 306. Accordingly, with a reduced BSS transition signaling overhead, the STA 302 may experience less packet delays and/or packet drops while transitioning/being handed off to different APs within the ESS zone including the AP₁ 304 and the AP₂ 306.

Figure 4:
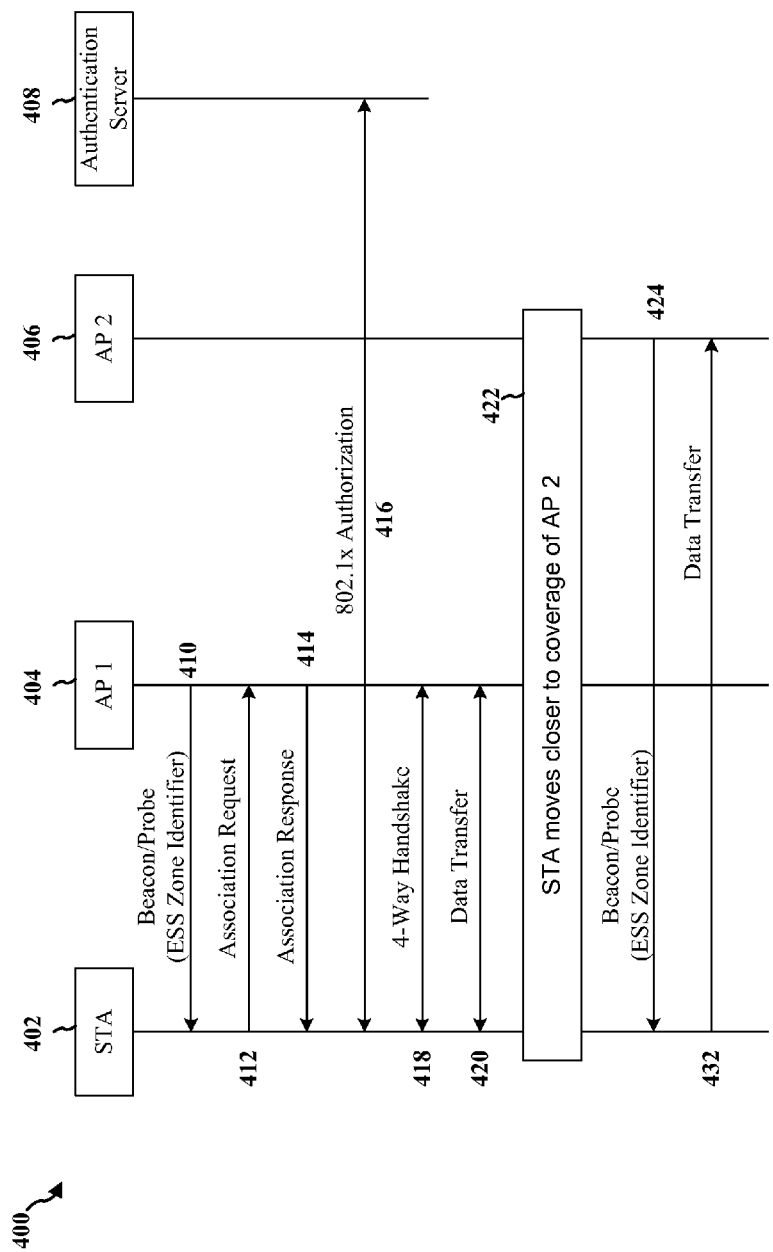
FIG. 4 is a diagram illustrating a second exemplary call flow.

FIG. 4 is a diagram 400 illustrating a second exemplary call flow. As shown in FIG. 4, in step 410, a STA 402 receives a beacon/probe with an identifier from the AP₁ 404. The identifier may be a zone identifier identifying a set of APs that belong to a security domain in which context information of the STA 402 can be transferred from one AP to another AP. In particular, the zone identifier may be an ESS zone identifier. The set of APs may be defined as an ESS zone. APs in the same ESS zone are capable of sharing association information associated with communication with particular STAs. Association information may include radio parameters (e.g., QoS requirements, preferences, number of flows, etc.) and/or keys for communicating with particular STAs. The set of APs may be preconfigured to broadcast the same identifier. As such, the set of APs includes the AP₁ 404 and other APs that broadcast the same identifier. For example, if the set of APs (i.e., a particular ESS zone) is preconfigured to include both the AP₁ 404 and the AP₂ 406, then the AP₁ 404 and the AP₂ 406 will broadcast the same identifier. The common broadcasted identifier may be referred to as a zone identifier or an ESS zone identifier.

In step 412, the STA 402 sends an association request to the AP₁ 404 in an association request frame. In step 414, the AP₁ 404 sends an association response to the STA 402 in an association response frame. The association response may include an association identifier of the STA 402. The association identifier is unique to the STA 402 within an ESS zone. The association identifier of the STA 402 may be shorter than the MAC address of the STA 402 and may have a one-to-one mapping between the MAC address of the STA 402. In step 416, the STA 402 performs an 802.1x authorization with an authentication server 408, which may include an EAP request, response, and exchange. In step 418, the STA 402 and the AP₁ 404 perform a four-way handshake and exchange EAPoL-Key frames in order to generate the PTK and exchange the GTK. Both the STA 402 and the AP₁ 404 generate the PTK based on the ESS zone identifier. In particular, the PTK is derived as a result of an EAPoL-PRF of a PMK, the ANonce, the SNonce, the ESS zone identifier, and the MAC address of the STA 402. Specifically, the PTK is generated as follows: PTK=EAPoL-PRF (PMK, ANonce|SNonce|ESS Zone Identifier|STA MAC Address).

In step 420, based on the keys generated/obtained during the four-way handshake, the STA 402 and the AP₁ 404 communicate. In step 422, the STA 402 moves into coverage of the AP₂ 406. The AP₂ 406 is in the same ESS zone as the AP₁ 404. Accordingly, the AP₂ 406 broadcasts the same ESS zone identifier in a beacon/probe as the AP₁ 404. The STA 402 receives the ESS zone identifier broadcasted from the AP₂ 406 and determines that the AP₂ 406 is in the same ESS zone as the AP₁ 404. In a first configuration, in step 432, the STA 402 may send an uplink packet to the AP₂ 406. The AP₂ 406 receives the uplink packet, and determines the transmitter address (TA) indicated in the uplink packet. As the STA 402 transmitted the uplink packet, the TA is the address of the STA 402. The AP₂ 406 then accesses a centralized location to determine the AP that last served the STA 402 or communicates with APs in its ESS zone to determine the AP that last served the STA 402. The AP₂ 406 then fetches the association information for the STA 402 from the AP₁ 404. In a second configuration, the AP₁ 404 may determine that the STA 402 is no longer in its coverage area if the AP₁ 404 does not receive a power save poll (PS-Poll) request from the STA 402 for a certain duration of time (e.g., 50 ms) after paging the STA 402. The AP₁ 404 may then send information through the backhaul to other APs in its ESS zone that the STA 402 may have moved into their coverage area. The information may further include an identifier of the STA 402, such as an association identifier or a MAC address of the STA 402. The AP₂ 406 may receive the information indicating that the STA 402 may be in its coverage area from the AP₁ 404. The AP₂ 406 (as well as other APs in the ESS zone that received the information from the AP₁ 404) may page the STA 402. If the STA 402 responds with a page response, the AP₂ 406 fetches the association information of the STA 402 from the AP₁ 404 based on the identifier of the STA 402 provided by the AP₁ 404.

The steps described in relation to FIG. 4 reduce BSS transition signaling overhead from at least three roundtrips to no roundtrips between the STA 402 and the AP₂ 406.

Accordingly, with a reduced BSS transition signaling overhead, the STA 402 may experience less packet delays and/or packet drops while transitioning/being handed off to different APs within the ESS zone including the $AP_1$ 404 and the $AP_2$ 406.

Figure 5:
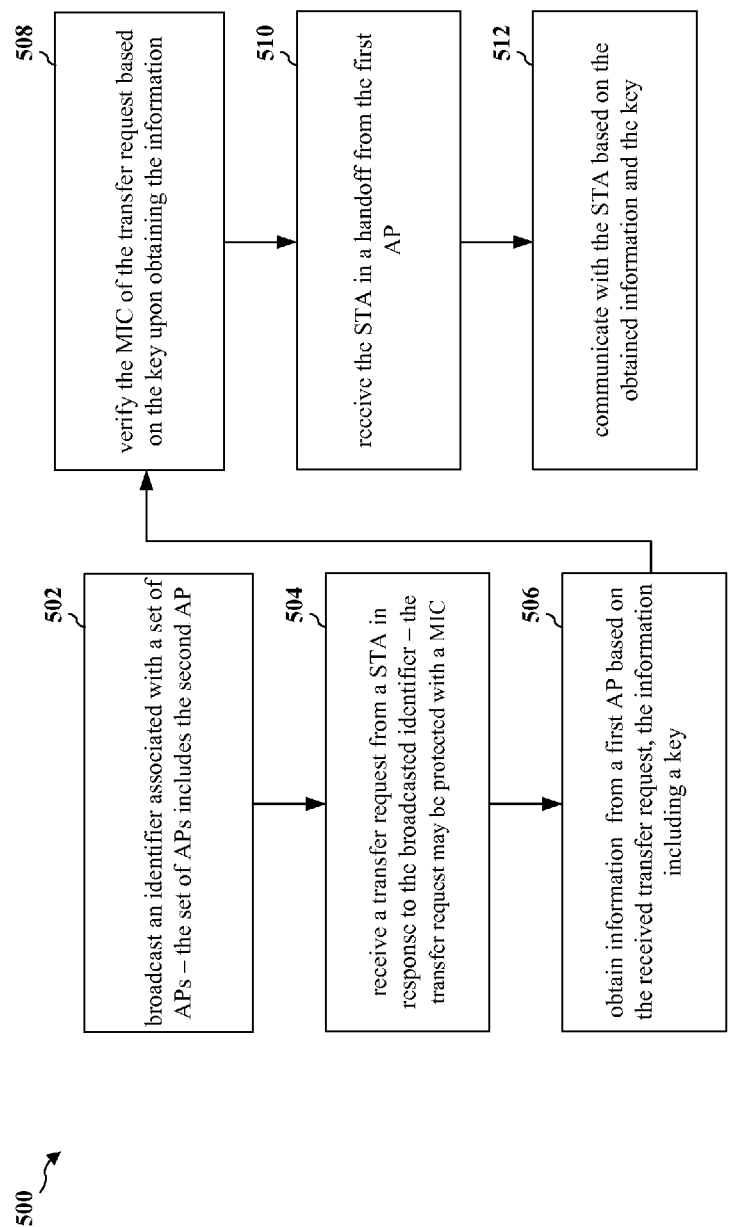
FIG. 5 is a flow chart of a first method of wireless communication.

FIG. 5 is a flow chart 500 of a first method of wireless communication. The method may be performed by a second AP in a WLAN. As shown in FIG. 5, in step 502, the second AP broadcasts an identifier associated with a set of APs. The set of APs includes the second AP. For example, referring to FIG. 3, in step 324, the second $AP_2$ 306 broadcasts an ESS zone identifier associated with a set of APs including the first $AP_1$ 304 and the second $AP_2$ 306. In step 504, the second AP receives a transfer request from a STA in response to the broadcasted identifier. In step 506, the second AP obtains information (e.g., association information) from a first AP based on the received transfer request. The information includes a key. If the transfer request is protected with a MIC, in step 508, the second AP may verify the MIC of the transfer request based on the key upon obtaining the information. In step 510, the second AP receives the STA in a handoff from the first AP (i.e., the STA is handed off from the first AP to the second AP). In step 512, the second AP communicates with the STA based on the obtained information and the key.

In step 506, the key obtained from the first AP and utilized in communication with the STA may be a PTK. The PTK may be a function of the broadcasted identifier. For example, the PTK may be a function of the ESS zone identifier. In step 502, the broadcasted identifier may be a zone identifier identifying the set of APs that belong to a security domain in which context information of the STA can be transferred from one AP to another AP. For example, the broadcasted identifier may be an ESS zone identifier. In step 504, the transfer request may request a transfer of the information from the first AP to the second AP. The transfer request may include an identifier of the first AP and an identifier of the STA. The identifier of the first AP may be a MAC address of the first AP. The identifier of the STA may be an association identifier of the STA. The identifier of the STA may be a MAC address of the STA or an identifier derived or mapped from the MAC address of the STA. In step 512, the communication with the STA based on the obtained information and the key may occur without previously performing a four-way handshake with the STA to generate a key after the handoff.

Figure 6:
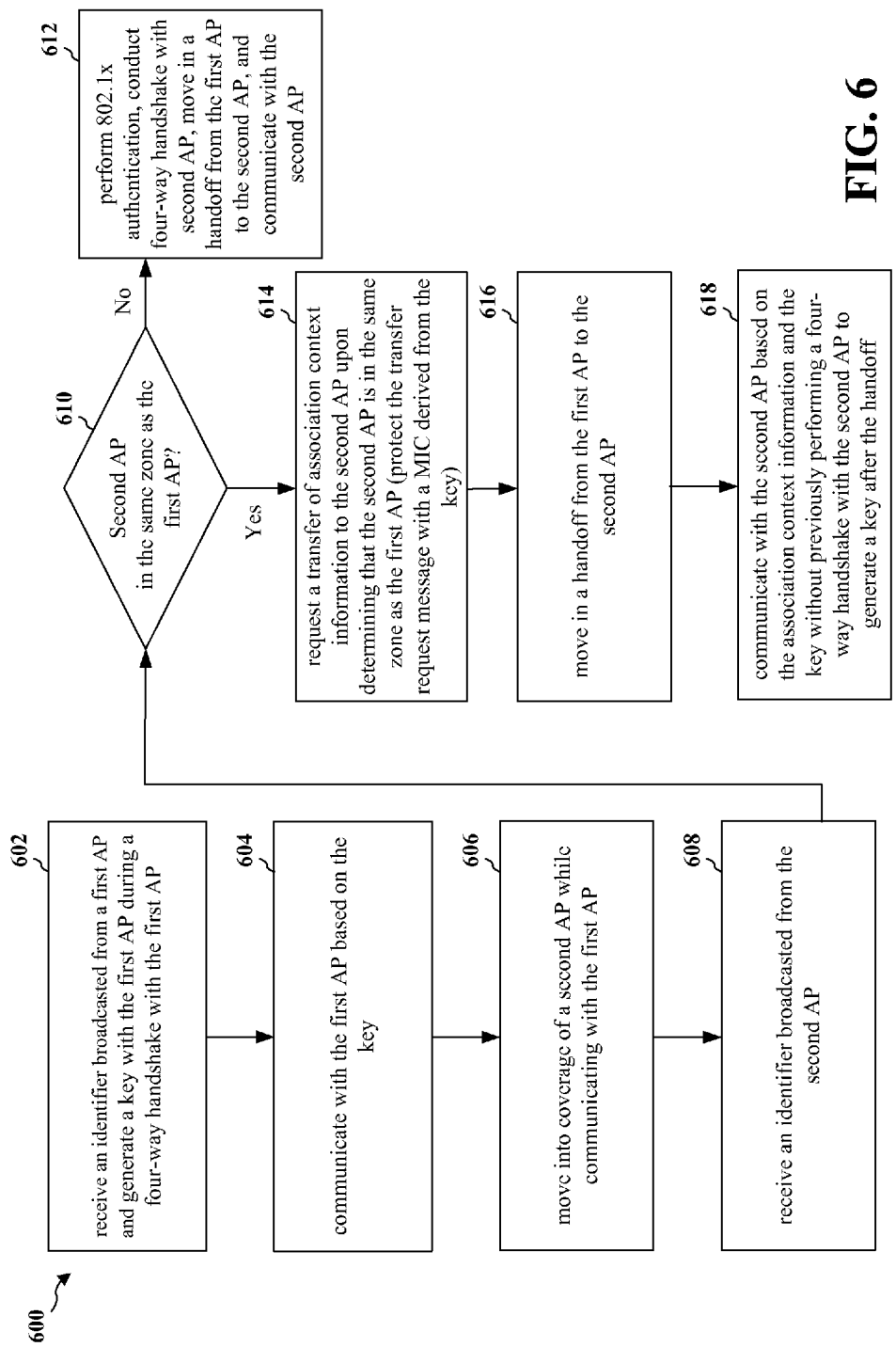
FIG. 6 is a flow chart of a second method of wireless communication.

FIG. 6 is a flow chart 600 of a second method of wireless communication. The method may be performed by a STA in a WLAN. In step 602, the STA receives an identifier broadcasted from a first AP and generates a key with the first AP during a four-way handshake with the first AP. The key is a function of the identifier broadcasted from the first AP. In step 604, the STA communicates with the first AP based on the key. In step 606, the STA moves into coverage of a second AP while communicating with the first AP. In step 608, the STA receives an identifier broadcasted from the second AP. In step 610, the STA determines whether the second AP is associated with the first AP based on the received identifier. If the STA determines that the broadcasted identifier received from the second AP is identical to the broadcasted identifier received from the first AP, the STA determines that the second AP is in the same ESS zone as the first AP, and therefore that the second AP is associated with the first AP. If the STA determines that the broadcasted identifier received from the second AP is not identical to the broadcasted identifier received from the first AP, the STA determines that the second AP is not in the same ESS zone as the first AP, and therefore that the second AP is unassociated with the first AP. If the STA determines that the second AP is unassociated with the first AP (i.e., not in the same ESS zone), in step 612, the STA performs 802.1x authentication, conducts a four-way handshake with the second AP, moves in a handoff from the first AP to the second AP, and communicates with the second AP. If the STA determines that the second AP is associated with the first AP (i.e., is in the same ESS zone), in step 614, the STA requests a transfer of association context information to the second AP upon determining that the second AP is associated with the first AP.

The key may be a PTK. The PTK may be a function of the identifier broadcasted when the second AP is associated with the first AP. Specifically, the STA generates the PTK based on the broadcasted identifier from the first AP. If the second AP and the first AP are associated, the second AP and the first AP are in the same ESS zone, and the broadcasted identifier from the second AP would be identical to the broadcasted identifier from the first AP. As such, the PTK is a function of the broadcasted identifier when the second AP is associated with the first AP.

The broadcasted identifier from the second AP may be a zone identifier identifying a set of APs that belong to a security domain in which association context information of the STA can be transferred from one AP to another AP. The set of APs may include the second AP, and the set of APs may include the first AP when the first AP is associated with the same identifier. The second AP may be determined to be associated with the first AP when the broadcasted identifier from the second AP is identical to the broadcasted identifier from the first AP. The request to transfer the information may be sent to the second AP in a transfer request, and the transfer request may include an identifier of the first AP and an identifier of the STA. The identifier of the first AP may be a MAC address of the first AP. The identifier of the STA may be an association identifier of the STA. The identifier of the STA may be a MAC address of the STA or an identifier derived or mapped from the MAC address of the STA. In step 614, the STA may protect the transfer request message with a MIC derived from the key. In step 616, the STA may move in a handoff from the first AP to the second AP. In step 618, the STA may communicate with the second AP based on the association context information and the key without previously performing a four-way handshake with the second AP to generate a key after the handoff.

Figure 7:
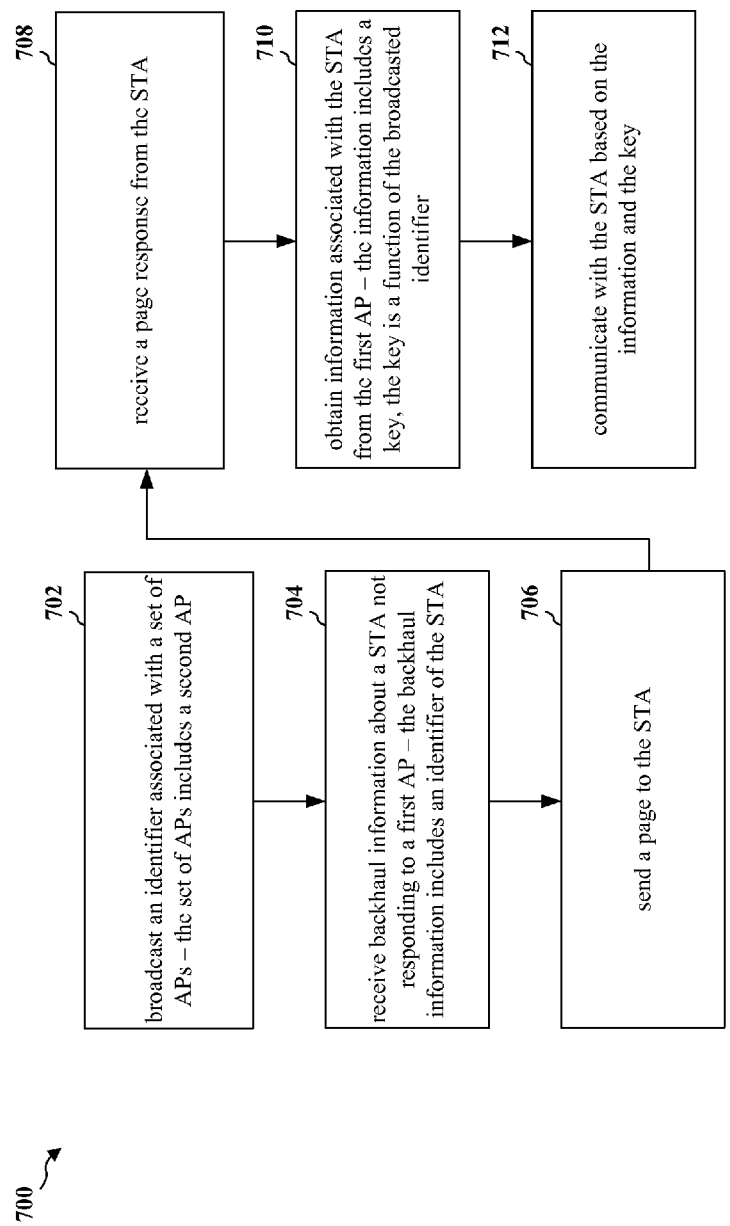
FIG. 7 is a flow chart of a third method of wireless communication.

FIG. 7 is a flow chart 700 of a third method of wireless communication. The method may be performed by a second AP in a WLAN. As shown in FIG. 7, in step 702, the second AP broadcasts an identifier associated with a set of APs. The set of APs includes the second AP. The broadcasted identifier may be a zone identifier identifying the set of APs that belong to a security domain in which context information of the STA can be transferred from one AP to another AP. For example, referring to FIG. 4, in step 424, the second $AP_2$ 406 broadcasts an ESS zone identifier associated with a set of APs including the first $AP_1$ 404 and the second $AP_2$ 406. In step 704, the second AP receives backhaul information about a STA not responding to a first AP. The backhaul information includes an identifier of the STA. The identifier of the STA may be an association identifier of the STA. The identifier of the STA may be a MAC address of the STA or an identifier derived or mapped from the MAC address of the STA. The backhaul information may be received from the first AP or from a central controller. In step 706, the second AP sends a page to the STA. In step 708, the second AP receives a page response from the STA. In step 710, the second AP obtains information (e.g., association information) associated with the STA from the first AP. The information includes a key. The key is a function of the identifier broadcasted in step 702. The key obtained from the first AP and utilized in communication with the STA may be a PTK. In step 712, the second AP communicates with the STA based on the information and the key.

Figure 8:
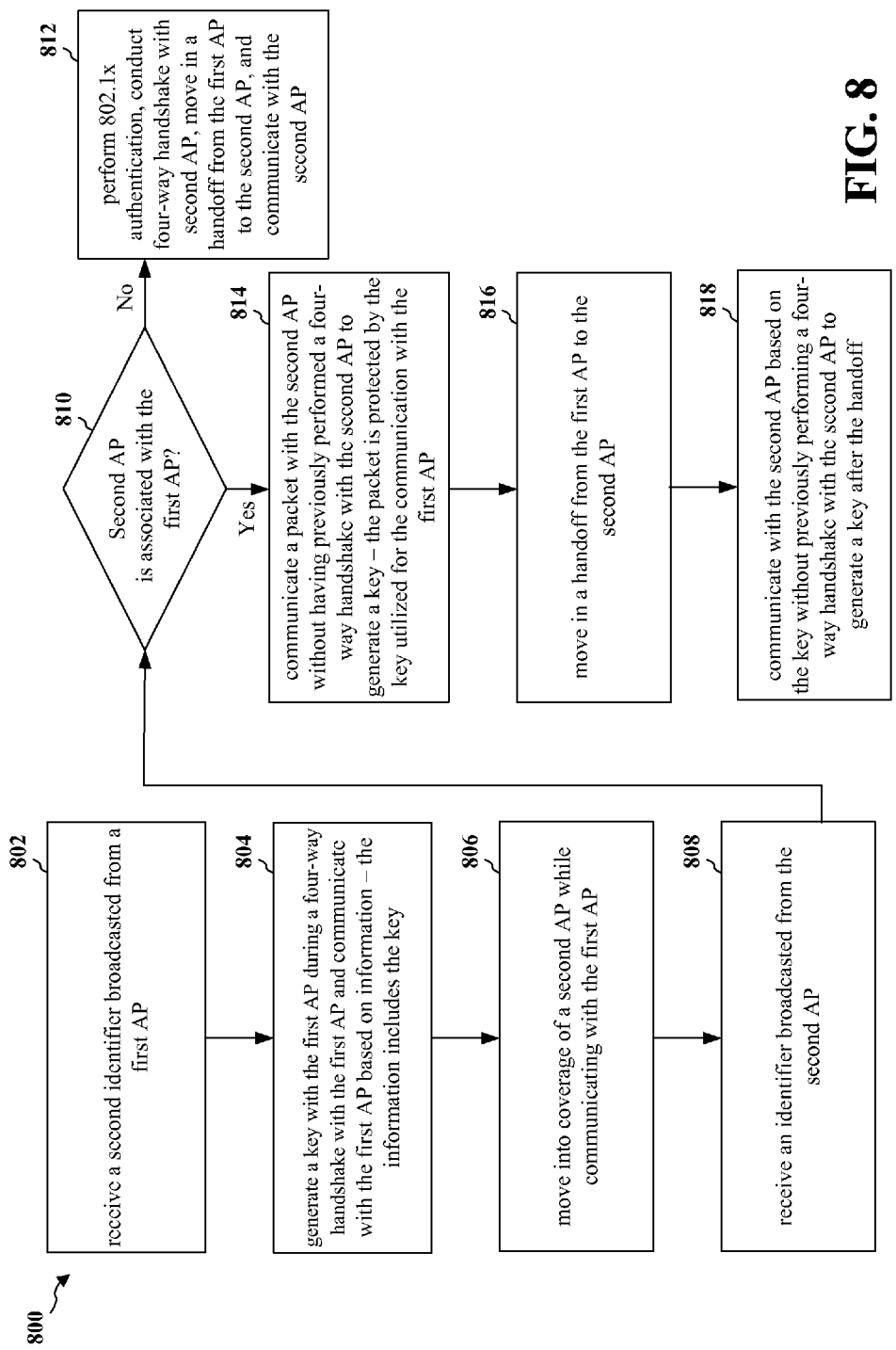
FIG. 8 is a flow chart of a fourth method of wireless communication.

FIG. 8 is a flow chart 800 of a fourth method of wireless communication. The method may be performed by a STA in a WLAN. In step 802, the STA receives a second identifier broadcasted from a first AP. In step 804, the STA generates a key with the first AP during a four-way handshake with the first AP and communicates with the first AP based on information. The information includes the key. The key is a function of the broadcasted second identifier received from the first AP. In step 806, the STA moves into coverage of a second AP while communicating with the first AP. In step 808, the STA receives an identifier broadcasted from the second AP. In step 810, the STA determines whether the second AP is associated with the first AP based on the received broadcasted identifier. If the STA determines that the second AP is unassociated with the first AP (the received broadcasted identifier is not identical to the received second broadcasted identifier), in step 812, the STA performs 802.1x authentication, conducts a four-way handshake with the AP, moves in a handoff from the first AP to the second AP, and communicates with the second AP. If the STA determines that the second AP is associated with the first AP (the received broadcasted identifier is identical to the received second broadcasted identifier), in step 812, the STA communicates a packet with the second AP without having previously performed a four-way handshake with the second AP to generate a key. The STA protects the packet by the key utilized for the communication with the first AP.

In step 814, the STA may send an uplink packet protected based on the key to the second AP upon determining that the second AP is associated with the first AP. The STA may protect the uplink packet based on the key prior to sending the uplink packet. In step 816, the STA may move in a handoff from the first AP to the second AP upon sending the uplink packet to the second AP. In step 818, the STA may communicate with the second AP based on the key without previously performing a four-way handshake with the second AP to generate a key after the handoff. In step 814, the STA may receive a downlink packet protected based on the key from the second AP.

The key may be a PTK. The PTK may be a function of an identifier associated with both the first AP and the second AP. The identifier may be a zone identifier identifying a set of APs that belong to a security domain in which context information of the STA can be transferred from one AP to another AP. The set of APs may include the first AP and the second AP. For example, the identifier may be an ESS zone identifier associated with an ESS zone including the first AP and the second AP.

Figure 9:
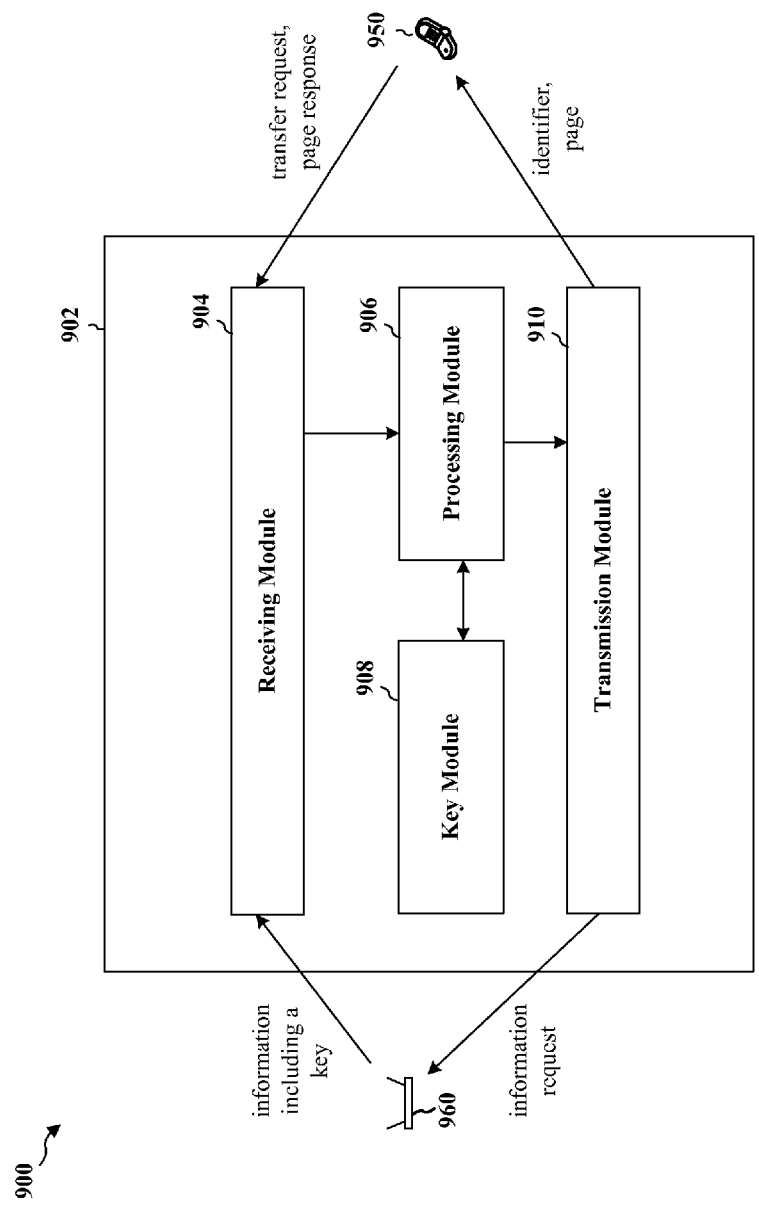
FIG. 9 is a conceptual data flow diagram illustrating the data flow between different modules/means/components in a first exemplary apparatus.

FIG. 9 is a conceptual data flow diagram 900 illustrating the data flow between different modules/means/components in a first exemplary apparatus 902. The apparatus 902 may be a second AP. The second AP 902 includes a receiving module 904, a processing module 906, a key module 908, and a transmission module 910. In one configuration, the transmission module 910 is configured to broadcast an identifier associated with a set of APs. The set of APs includes the second AP 902. The receiving module 904 is configured to receive a transfer request from a STA 950 in response to the broadcasted identifier. The transmission module 910 and the receiving module 904 are configured to obtain information from a first AP 960 based on the received transfer request. The information includes a key. The receiving module 904 provides the information including the key to the processing module 906. The processing module 906 provides the key to the key module 908. The processing module 906 is configured to receive the STA 950 in a handoff from the first AP 960. Both the receiving module 904 and the transmission module 910 are configured to communicate with the STA 950 based on the obtained information and the key.

The key obtained from the first AP 960 and utilized in communication with the STA 950 may be a PTK. The PTK may be a function of the broadcasted identifier. The broadcasted identifier may be a zone identifier identifying the set of APs that belong to a security domain in which context information of the STA 950 can be transferred from one AP to another AP. The transfer request may requests a transfer of the information from the first AP 960 to the second AP 902. The transfer request may be protected with a MIC. The processing module 906 may be further configured to verify the MIC of the transfer request based on the key upon obtaining the information. The transfer request may include an identifier of the first AP 960 and an identifier of the STA 950. The identifier of the first AP 960 may be a MAC address of the first AP 960. The identifier of the STA 950 may be an association identifier of the STA 950. The identifier of the STA 950 may be a MAC address of the STA 950 or an identifier derived or mapped from the MAC address of the STA 950. The transmission module 910 may be further configured to communicate with the STA 950 based on the obtained information and the key without previously performing a four-way handshake with the STA 950 to generate a key after the handoff.

In one configuration, the receiving module 904 is configured to receive backhaul information about the STA 950 not responding to the first AP 960. The backhaul information includes an identifier of the STA 950. The transmission module 910 is configured to send a page to the STA 950. The receiving module 904 is configured to receive a page response from the STA 950. The transmission module 910 and the receiving module 904 are further configured to obtain information associated with the STA 950 from the first AP 960. The information includes a key. The receiving module 904 provides the information including the key to the processing module 906. The processing module 906 provides the key to the key module 908. Both the receiving module 904 and the transmission module 910 are configured to communicate with the STA 950 based on the information and the key.

The backhaul information may be received from the first AP 960. The backhaul information may be received from a central controller. The key obtained from the first AP 960 and utilized in communication with the STA 950 may be a PTK. The transmission module 910 may be further configured to broadcast an identifier associated with a set of APs. The set of APs includes the second AP 902. The key is a function of the broadcasted identifier. The broadcasted identifier may be a zone identifier identifying the set of APs that belong to a security domain in which context information of the STA 950 can be transferred from one AP to another AP. The identifier of the STA 950 may be an association identifier of the STA 950. The identifier of the STA 950 may be a MAC address of the STA 950 or an identifier derived or mapped from the MAC address of the STA 950.

The apparatus may include additional modules that perform each of the steps of the algorithm in the aforementioned flow charts of FIGS. 5 and 7. As such, each step in the aforementioned flow charts of FIGS. 5 and 7 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
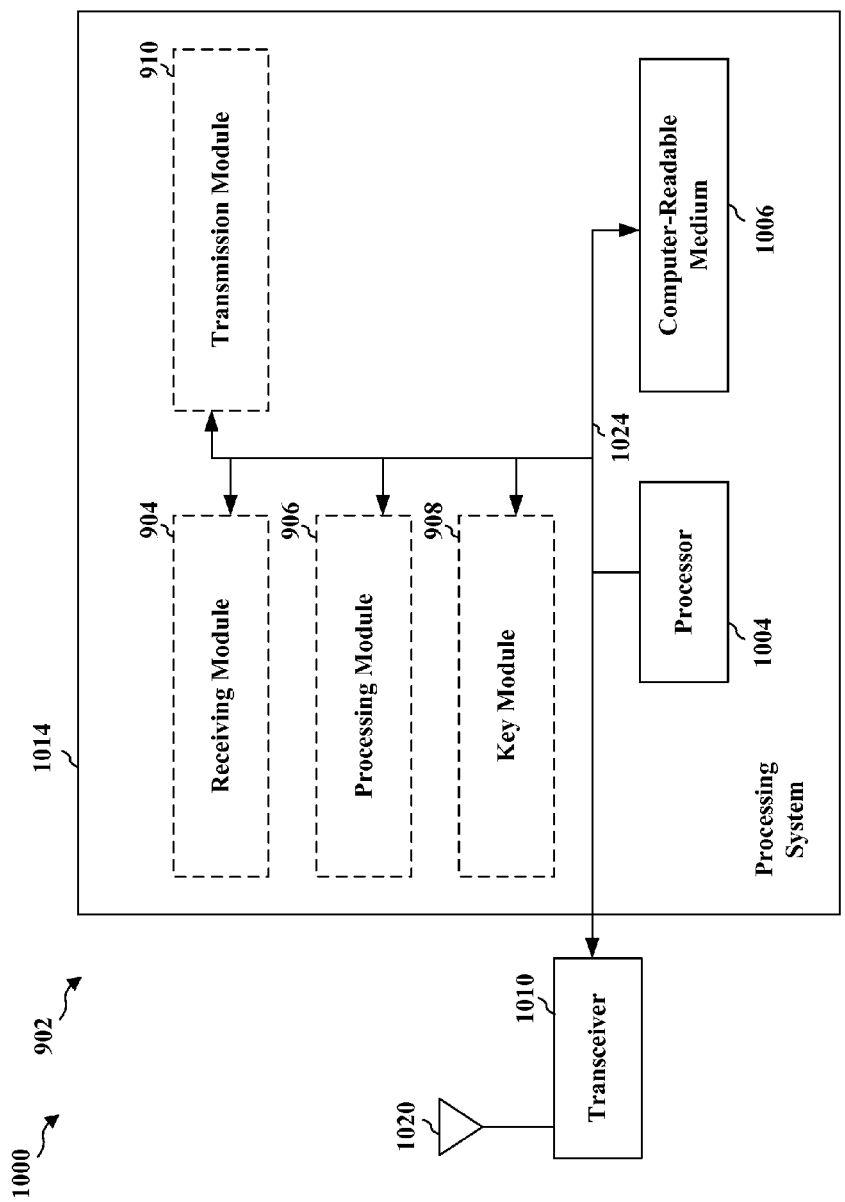
FIG. 10 is a diagram illustrating an example of a hardware implementation for the first apparatus employing a processing system.

FIG. 10 is a diagram 1000 illustrating an example of a hardware implementation for the first apparatus 902 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910 and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014. In addition, the transceiver 1010 receives information from the processing system 1014, and based on the received information, generates a signal to be applied to the one or more antennas 1020. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910. The modules may be software modules running in the processor 1004, resident/stored in the computer readable medium 1006, one or more hardware modules coupled to the processor 1004, or some combination thereof.

In one configuration, the apparatus 902 for wireless communication is a second AP and includes means for broadcasting an identifier associated with a set of APs, the set of APs including the second AP. The second AP further includes means for receiving a transfer request from a STA in response to the broadcasted identifier. The second AP further includes means for obtaining information from a first AP based on the received transfer request. The information includes a key. The second AP further includes means for receiving the STA in a handoff from the first AP. The second AP further includes means for communicating with the STA based on the obtained information and the key. In one configuration, the transfer request is protected with a MIC, and the second AP further includes means for verifying the MIC of the transfer request based on the key upon obtaining the information. The means for communicating with the STA may communicate based on the obtained information and the key without previously performing a four-way handshake with the STA to generate a key after the handoff. The aforementioned means may be one or more of the aforementioned modules of the apparatus 902 and/or the processing system 1014 of the apparatus 902 configured to perform the functions recited by the aforementioned means.

In one configuration, the apparatus 902 for wireless communication is a second AP and includes means for receiving backhaul information about a STA not responding to a first AP. The backhaul information includes an identifier of the STA. The second AP further includes means for sending a page to the STA, means for receiving a page response from the STA, and means for obtaining information associated with the STA from the first AP. The information includes a key. The second AP further includes means for communicating with the STA based on the information and the key. The second AP may further include means for broadcasting an identifier associated with a set of APs. The set of APs may include the second AP. The key may be a function of the broadcasted identifier. The aforementioned means may be one or more of the aforementioned modules of the apparatus 902 and/or the processing system 1014 of the apparatus 902 configured to perform the functions recited by the aforementioned means.

Figure 11:
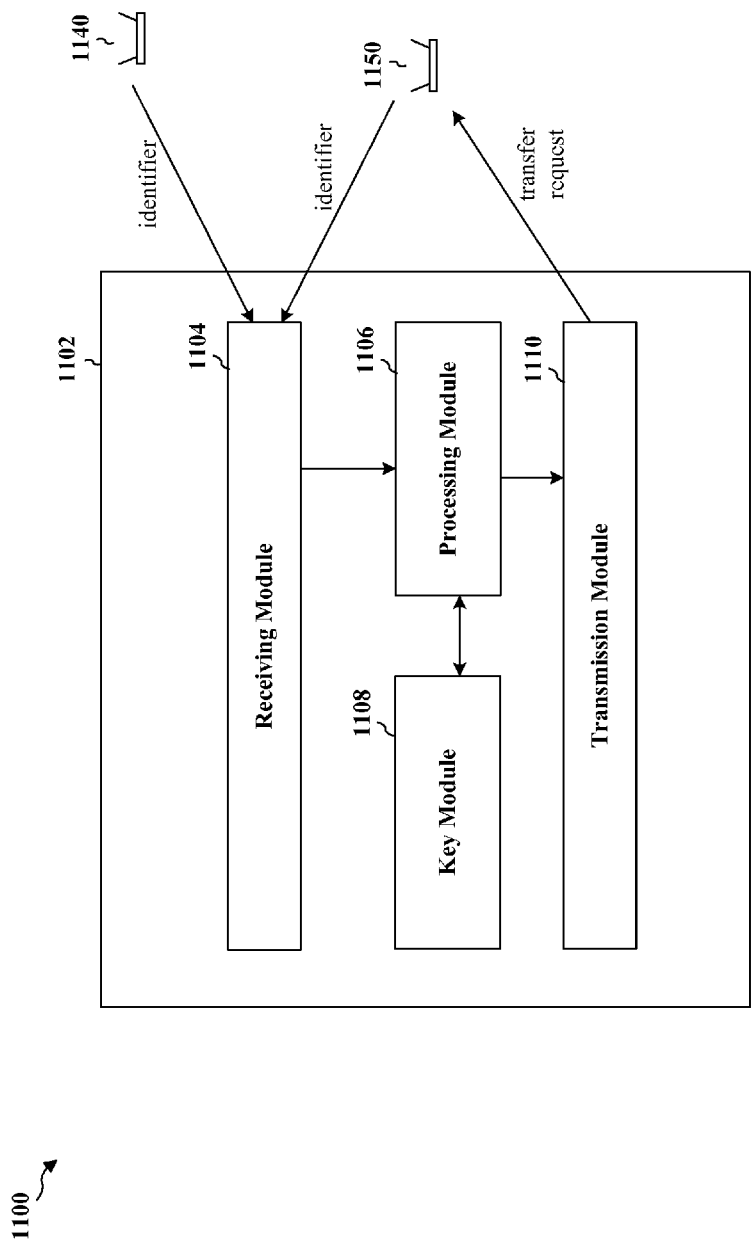
FIG. 11 is a conceptual data flow diagram illustrating the data flow between different modules/means/components in a first exemplary apparatus.

FIG. 11 is a conceptual data flow diagram 1100 illustrating the data flow between different modules/means/components in a first exemplary apparatus 1102. The apparatus 1102 may be a STA. The STA 1102 includes a receiving module 1104, a processing module 1106, a key module 1108, and a transmission module 1110. In one configuration, the receiving module 1104 and the transmission module 1110 are configured to communicate with a first AP 1140 based on information. The information includes a key. The receiving module 1104 and the transmission module 1110 are configured to interface with the processing module 1106, which interfaces with the key module 1108, in order to communicate based on the key. The STA 1102 is configured to move into coverage of a second AP 1150 while communicating with the first AP 1140. The receiving module 1104 is configured to receive an identifier broadcasted from the second AP 1150. The processing module 1106 is configured to determine whether the second AP 1150 is associated with the first AP 1140 based on the received identifier. The processing module 1106 is configured to communicate with the transmission module 1110 in order to request a transfer of the information to the second AP 1150 upon determining that the second AP 1150 is associated with the first AP 1140.

The key may be a PTK. The PTK may be a function of the broadcasted identifier when the second AP 1150 is associated with the first AP 1140. The broadcasted identifier may be a zone identifier identifying a set of APs that belong to a security domain in which context information of the STA 1102 can be transferred from one AP to another AP. The set of APs may include the second AP 1150. The set of APs may include the first AP 1140 when the second AP 1150 is associated with the first AP 1140. The receiving module 1104 may be configured to receive a second identifier broadcasted from the first AP 1140. The processing module 1106 is configured to determine that the second AP 1150 is associated with the first AP 1140 when the broadcasted identifier is identical to the second broadcasted identifier. The request to transfer the information may be sent to the second AP 1150 in a transfer request, and the transfer request may include an identifier of the first AP 1140 and an identifier of the STA 1102. The identifier of the first AP 1140 may be a MAC address of the first AP 1140. The identifier of the STA 1102 may be an association identifier of the STA 1102. The identifier of the STA 1102 may be a MAC address of the STA 1102 or an identifier derived or mapped from the MAC address of the STA 1102. The processing module 1106 may interface with the key module 1108 in order to protect the transfer request message with a MIC derived from the key. The STA 1102 may move in a handoff from the first AP 1140 to the second AP 1150. The receiving module 1104 and the transmission module 1110 may be configured to communicate with the second AP 1150 based on the information and the key without previously performing a four-way handshake with the second AP 1150 to generate a key after the handoff. The key module 1108 may be configured to generate the key with the first AP 1140 during a four-way handshake with the first AP 1140.

In one configuration, the receiving module 1104 and the transmission module 1110 are configured to communicate with a first AP 1140 based on information. The information includes a key. The STA 1102 moves into coverage of a second AP 1150 while communicating with the first AP 1140. The receiving module 1104 and the transmission module 1110 are configured to communicate a packet with the second AP 1150 without having previously performed a four-way handshake with the second AP 1150 to generate a key. The packet is protected by the key utilized for the communication with the first AP 1140. The receiving module 1104 may be configured to receive an identifier broadcasted from the second AP 1150. The processing module 1106 may be configured to determine that the second AP 1150 is associated with the first AP 1140 based on the received broadcasted identifier. The transmission module 1110 may be configured to send an uplink packet protected based on the key to the second AP 1150 upon determining that the second AP 1150 is associated with the first AP 1140. The processing module 1106 may be configured to interface with the key module 1108 in order to protect the uplink packet based on the key prior to sending the uplink packet. The STA 1102 may move in a handoff from the first AP 1140 to the second AP 1150 upon sending the uplink packet to the second AP 1150. Both the receiving module 1104 and the transmission module 1110 may be configured to communicate with the second AP 1150 based on the key without previously performing a four-way handshake with the second AP 1150 to generate a key after the handoff. The receiving module 1104 may be configured to receive a second identifier broadcasted from the first AP 1140. The processing module 1106 may be configured to determine that the second AP 1150 is associated with the first AP 1140 when the received broadcasted identifier is identical to the received second broadcasted identifier. The receiving module 1104 may be configured to receive a downlink packet protected based on the key from the second AP 1150. The key may be a PTK. The PTK may be a function of an identifier associated with both the first AP 1140 and the second AP 1150. The identifier may be a zone identifier identifying a set of APs that belong to a security domain in which context information of the STA 1102 can be transferred from one AP to another AP. The set of APs may include the first AP 1140 and the second AP 1150. The key module 1108 may be configured to generate the key with the first AP 1140 during a four-way handshake with the first AP 1140.

The apparatus may include additional modules that perform each of the steps of the algorithm in the aforementioned flow charts of FIGS. 6 and 8. As such, each step in the aforementioned flow charts of FIGS. 6 and 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
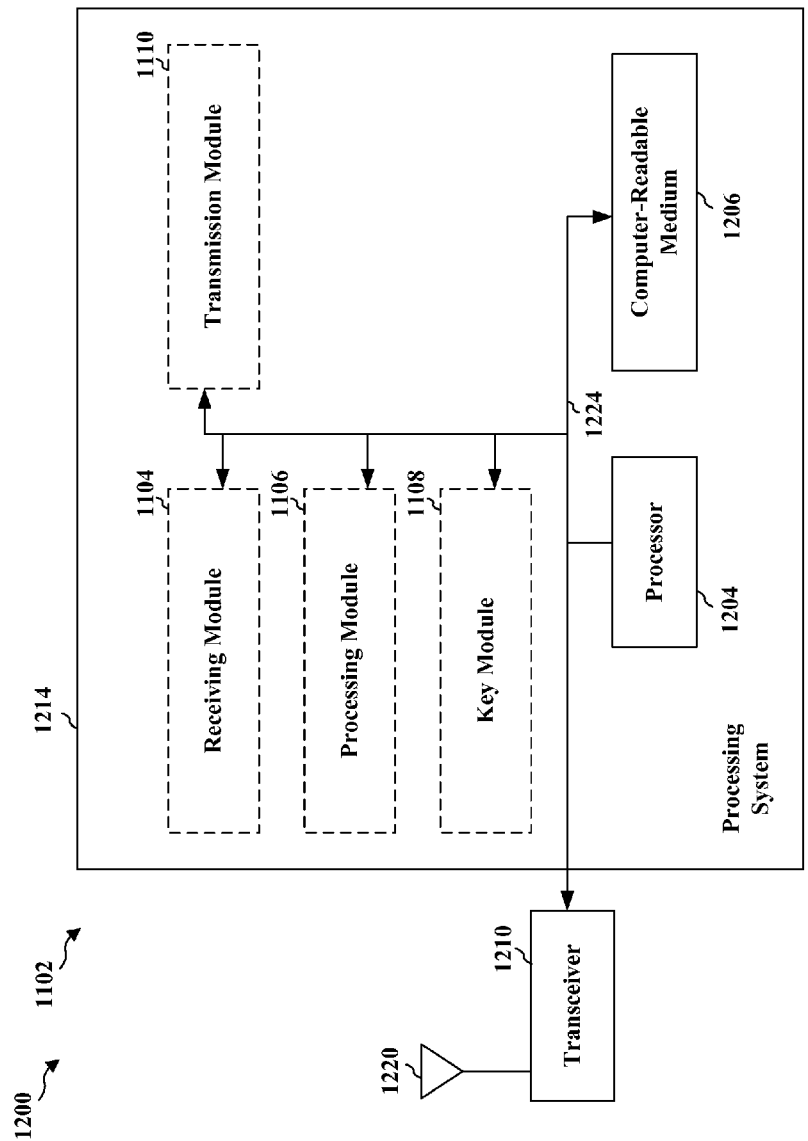
FIG. 12 is a diagram illustrating an example of a hardware implementation for the first apparatus employing a processing system.

FIG. 12 is a diagram 1200 illustrating an example of a hardware implementation for the first apparatus 1102 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110 and the computer-readable medium 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214. In addition, the transceiver 1210 receives information from the processing system 1214, and based on the received information, generates a signal to be applied to the one or more antennas 1220. The processing system 1214 includes a processor 1204 coupled to a computer-readable medium 1206. The processor 1204 is responsible for general processing, including the execution of software stored on the computer-readable medium 1206. The software, when executed by the processor 1204, causes the processing system 1214 to perform the various functions described supra for any particular apparatus. The computer-readable medium 1206 may also be used for storing data that is manipulated by the processor 1204 when executing software. The processing system further includes at least one of the modules 1104, 1106, 1108, 1110. The modules may be software modules running in the processor 1204, resident/stored in the computer readable medium 1206, one or more hardware modules coupled to the processor 1204, or some combination thereof.

In one configuration, the apparatus 1102 for wireless communication is a STA and includes means for communicating with a first AP based on a key. The STA further includes means for receiving an identifier broadcasted from a second AP, means for determining whether the key can be used with the second AP based on the received identifier, means for selecting the second AP upon determining the key can be used with the second AP, and means for requesting a transfer of association context information from the first AP to the second AP. The STA may further include means for receiving a second identifier broadcasted from the first AP. The STA may determine that the key is able to be used with the second AP when the identifier is identical to the second identifier. The STA may further include means for generating the key with the first AP during a four-way handshake with the first AP. The aforementioned means may be one or more of the aforementioned modules of the apparatus 1102 and/or the processing system 1214 of the apparatus 1102 configured to perform the functions recited by the aforementioned means.

In one configuration, the apparatus 1102 for wireless communication is a STA and includes means for communicating with a first AP based on information. The information includes a key. The STA further includes means for moving into coverage of a second AP while communicating with the first AP. The STA further includes means for communicating a packet with the second AP without having previously performed a four-way handshake with the second AP to generate a key. The packet is protected by the key utilized for the communication with the first AP. The STA may further include means for receiving an identifier broadcasted from the second AP, and means for determining that the second AP is associated with the first AP based on the received broadcasted identifier. The means for communicating the packet may be configured to send an uplink packet protected based on the key to the second AP upon determining that the second AP is associated with the first AP. The STA may further include means for protecting the uplink packet based on the key prior to sending the uplink packet. The STA may further include means for moving in a handoff from the first AP to the second AP upon sending the uplink packet to the second AP, and means for communicating with the second AP based on the key without previously performing a four-way handshake with the second AP to generate a key after the handoff. The STA may further include means for receiving a second identifier broadcasted from the first AP. The second AP may be determined to be associated with the first AP when the received broadcasted identifier is identical to the received second broadcasted identifier. The STA may further include means for communicating the packet is configured to receive a downlink packet protected based on the key from the second AP. The STA may further include means for generating the key with the first AP during a four-way handshake with the first AP. The aforementioned means may be one or more of the aforementioned modules of the apparatus 1102 and/or the processing system 1214 of the apparatus 1102 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless local area network (WLAN) communication of a station (STA), comprising:
    receiving, by the STA, a first zone identifier transmitted from a first access point (AP);
    generating, by the STA, a key based on the first zone identifier;
    communicating, by the STA, with the first AP based on the key;
    receiving, by the STA, a second zone identifier transmitted from a second AP;
    determining, by the STA, that the second zone identifier is identical to the first zone identifier;
    determining, by the STA, that the second AP is in the same zone as the first AP based on the determination that the second zone identifier is identical to the first zone identifier; and
    transmitting, by the STA in response to the determination that the second AP is in the same zone as the first AP, a request to the second AP that instructs the second AP to request information from the first AP that is necessary for the second AP to communicate with the STA, wherein the information that is necessary for the second AP to communicate with the STA includes the key.

2. The method of claim 1, wherein the key is a pairwise transient key (PTK).

3. The method of claim 1, wherein the first zone identifier identifies a set of APs that belong to a security domain.

4. The method of claim 1, wherein the request comprises an identifier of the first AP and an identifier of the STA.

5. The method of claim 4, wherein the identifier of the first AP is a media access control (MAC) address of the first AP.

6. The method of claim 4, wherein the identifier of the STA is an association identifier of the STA, wherein the association identifier is unique to the STA within an extended service set zone.

7. The method of claim 4, wherein the identifier of the STA is a media access control (MAC) address of the STA or an identifier derived or mapped from the MAC address of the STA.

8. The method of claim 4, further comprising protecting the request with a message integrity code (MIC) derived from the key.

9. The method of claim 1, further comprising:
    moving into coverage of the second AP, wherein the second zone identifier is received after moving into coverage of the second AP; and
    communicating with the second AP based on the key without previously performing a handshake with the second AP.

10. The method of claim 1, wherein generating the key comprises generating the key during a four-way handshake with the first AP.

11. The method of claim 1, further comprising:
    receiving, from the second AP, a response to the request.

12. The method of claim 11, wherein the response indicates that the second AP successfully fetched the information that is necessary for the second AP to communicate with the STA from the first AP.

13. The method of claim 12, further comprising:
communicating with the second AP after receiving the response.

14. The method of claim 11, wherein the response indicates that the second AP unsuccessfully fetched the information that is necessary for the second AP to communicate with the STA from the first AP.

15. An apparatus for wireless local area network (WLAN) communication, the apparatus being a station (STA), comprising:
means for receiving a first zone identifier transmitted from a first access point (AP);
means for generating a key based on the first zone identifier;
means for communicating with the first AP based on the key;
means for receiving a second zone identifier transmitted from a second AP;
means for determining that the second zone identifier is identical to the first zone identifier;
means for determining that the second AP is in the same zone as the first AP based on the determination that the second zone identifier is identical to the first zone identifier; and
means for transmitting, in response to the determination that the second AP is in the same zone as the first AP, a request to the second AP that instructs the second AP to request information from the first AP that is necessary for the second AP to communicate with the STA, wherein the information that is necessary for the second AP to communicate with the STA includes the key.

16. The apparatus of claim 15, wherein the key is a pairwise transient key (PTK).

17. The apparatus of claim 15, wherein the first zone identifier identifies a set of APs that belong to a security domain.

18. The apparatus of claim 15, wherein the request comprises an identifier of the first AP and an identifier of the STA.

19. The apparatus of claim 15, wherein the means for generating the key is configured to generate the key during a four-way handshake with the first AP.

20. A non-transitory computer-readable medium having code stored thereon that, when executed, causes a station (STA) to:
receive a first zone identifier transmitted from a first access point (AP);
generate a key based on the first zone identifier;
communicating with the first AP based on the key;
receive a second zone identifier transmitted from a second AP;
determine that the second zone identifier is identical to the first zone identifier;
determine that the second AP is in the same zone as the first AP based on the determination that the second zone identifier is identical to the first zone identifier; and
transmit, in response to the determination that the second AP is in the same zone as the first AP, a request to the second AP that instructs the second AP to request information from the first AP that is necessary for the second AP to communicate with the STA, wherein the information that is necessary for the second AP to communicate with the STA includes the key.

* * * * *